(12) United States Patent
Cragun et al.

(10) Patent No.: US 6,598,040 B1
(45) Date of Patent: Jul. 22, 2003

(54) METHOD AND SYSTEM FOR PROCESSING ELECTRONIC SEARCH EXPRESSIONS

(75) Inventors: Brian John Cragun, Rochester, MN (US); Paul Reuben Day, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 292 days.

(21) Appl. No.: 09/638,223

(22) Filed: Aug. 14, 2000

(51) Int. Cl.[7] ............................................. G06F 17/30
(52) U.S. Cl. ................................. 707/3; 703/4; 703/5
(58) Field of Search ...................... 707/1–10, 100–104.1

(56) References Cited

U.S. PATENT DOCUMENTS

| | | | | |
|---|---|---|---|---|
| 4,674,066 A | * | 6/1987 | Kucera ........................ 400/63 |
| 5,175,814 A | * | 12/1992 | Anick et al. ................. 345/835 |
| 5,404,507 A | * | 4/1995 | Bohm et al. ................... 707/4 |
| 5,664,172 A | * | 9/1997 | Antoshenkov ................ 707/4 |
| 5,765,150 A | * | 6/1998 | Burrows ........................ 707/5 |
| 5,950,194 A | * | 9/1999 | Bennett et al. .............. 704/251 |
| 6,014,665 A | * | 1/2000 | Culliss ........................ 707/5 |
| 6,026,395 A | * | 2/2000 | Bennett et al. .............. 345/703 |
| 6,128,613 A | * | 10/2000 | Wong et al. .................... 707/7 |
| 6,212,517 B1 | * | 4/2001 | Sato et al. .................... 707/5 |
| 6,263,328 B1 | * | 7/2001 | Coden et al. .................. 707/3 |
| 6,341,277 B1 | * | 1/2002 | Coden et al. .................. 707/2 |
| 6,381,598 B1 | * | 4/2002 | Williamowski et al. ....... 707/1 |

FOREIGN PATENT DOCUMENTS

EP 1169686 A2 * 5/2002 ........... G06F/17/30

* cited by examiner

*Primary Examiner*—Greta Robinson
*Assistant Examiner*—Linh Black
(74) *Attorney, Agent, or Firm*—Bracewell & Patterson, LLP; Roy W. Truelson

(57) ABSTRACT

The present invention relates to a method, system, and program product for utilizing metawords to find electronic documents. According to the method of the present invention, a user specifies an initial search expression that includes at least one metaword. It is determined that the at least one metaword corresponds to a boolean expression, and, in response, an expanded search expression is generated. The expanded search expression includes the boolean expression in lieu of the at least one metaword, such that the expanded search expression is utilized in lieu of the initial search expression to find the electronic documents. In an illustrative embodiment, the determining step includes the step of determining that one or more terms and a count qualifier are associated with the at least one metaword. The count qualifier specifies a threshold number of occurrences of the one or more terms within a single electronic document.

16 Claims, 4 Drawing Sheets

METHOD AND SYSTEM FOR PROCESSING ELECTRONIC SEARCH EXPRESSIONS

BACKGROUND OF THE INVENTION

1. Technical Field

The present invention relates in general to data processing and in particular to the utilization of data processing systems to locate desired data. Still more particularly, the present invention relates to methods and systems for processing search expressions for use in locating desired electronic documents.

2. Description of the Related Art

The World Wide Web (i.e., the Web) denotes a vast set of interlinked documents (i.e., Web pages) residing on various data processing systems around the globe. In recent years, the Web has experienced rapid growth, to the point that the Web now contains millions of documents. The data processing systems that serve up these documents on request are called servers, and when a data processing system is utilized to retrieve a document from a server, the retrieving data processing system is considered a client.

In general, the interlinked documents are publicly accessible and are retrieved using the communications protocols known as "HTTP" (which stands for Hypertext Transfer Protocol) and "TCP/IP" (which stands for Transmission Control Protocol/Internet Protocol). The servers, communications networks, and related facilities that provide access to the documents of the Web are known collectively as the Internet.

In addition to Web documents, a number of services are also available via the Internet, including search engines, which help in identifying which of the millions of Web documents relate to particular subjects of interest. Typically, a search engine includes a Web page that serves as a user interface through which a user enters a search expression, a database that associates Web page go addresses with Web page content, and a comparator that determines which of the Web pages in the database include content corresponding to the entered search expression. The addresses of the corresponding Web pages are returned in what is called a "hit list." For example, if a user were to enter a search expression consisting of a particular word, the resulting hit list would provide the addresses of Web pages containing that word.

However, search expressions that simply list a small number of words relating to a subject often cause search engines to produce inefficient hit lists (i.e., hit lists that include unhelpful sites and/or that fail to include a reasonably large number of helpful sites). For instance, a user wanting to identify Web pages with substantive content concerning World War II might enter the search expression "World War II." The search engine would then return a hit list of Web pages containing the entered words. In addition to the hits with the desired substantive content, however, the hit list will likely also contain hits with no substantive content relating to the subject in question (such as hits identifying Web pages with mere advertisements for books on the subject). Unless one is looking for a book, the hits relating to mere book advertisements get in the way because they show up in the hit list but generally do not answer any substantive questions or provide any significant amount of substantive information regarding the subject of interest. In addition, due to the large number of Web pages now in existence, overbroad hit lists often identify substantially more Web pages than a user can conveniently explore.

Obtaining efficient hit lists is one of the biggest challenges associated with utilizing the Web. To address this challenge, many search engines allow users to enter searches, known as "boolean searches," that are more complex than a simple list of words. In a boolean search, the user enters boolean operators along with the words of the search expression. Among the most common boolean operators is AND, OR, and NOT. Further, according to the syntax utilized by some search engines, AND, OR, and NOT may be abbreviated as &, |, and !, respectively. Also, OR is generally the default operator (which means that a search expression containing words but no explicit boolean operators is interpreted as if those words were joined with the OR operator). Quotation marks also act as boolean operators, allowing the user to group words into a phrase. Such a phrase produces a match only when that same phrase (i.e., all of the words in the same arrangement) is found in a Web page.

Some search engines also support include and exclude boolean operators, which may be entered as + and −, respectively. If a word is qualified with the include operator, a document is a match only if the document includes that word. If a word is qualified with the exclude operator, a document is a match only if the document does not include that word. In addition, parentheses may be utilized to group pieces of a search expression together, for instance to associate an include operator with one group of words but not another.

By utilizing boolean expressions, skilled database searchers are able to obtain more efficient hit lists. Many Web users, however, do not know and do not want to learn how to specify boolean searches. Furthermore, even for skilled searchers, substantial effort may be required to formulate and enter a search expression that is sufficiently complete to obtain a reasonably efficient hit list. What is needed, therefore, is a more convenient and effective way to generate efficient hit lists.

SUMMARY OF THE INVENTION

The present invention relates to a method, system, and program product for utilizing metawords to find electronic documents. According to the method of the present invention, a user specifies an initial search expression that includes at least one metaword. It is determined that the at least one metaword corresponds to a boolean expression, and, in response, an expanded search expression is generated. The expanded search expression includes the boolean expression in lieu of the at least one metaword, such that the expanded search expression is utilized in lieu of the initial search expression to find the electronic documents.

In an illustrative embodiment, the determining step includes the step of determining that one or more terms and a count qualifier are associated with the at least one metaword. The count qualifier specifies a threshold number of occurrences of the one or more terms within a single electronic document. The one or more terms and the count qualifier are included in the expanded search expression generated in the generating step.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
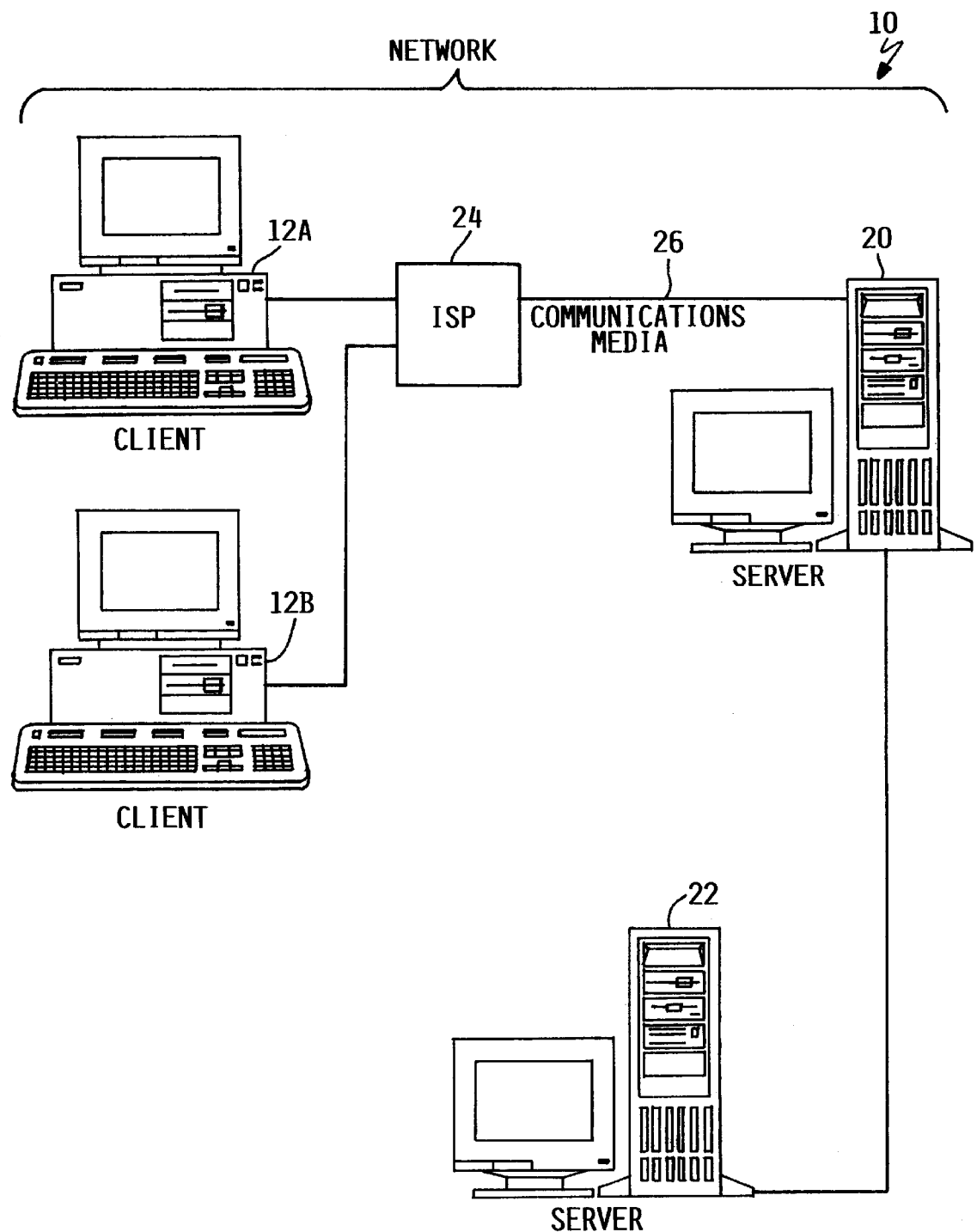
FIG. 1 illustrates an exemplary collaborative data processing environment with support for metaword searches according to the present invention.

With reference now to the figures, and in particular with reference to FIG. 1, there is depicted an exemplary collaborative data processing environment or network 10 according to the present invention. Network 10 includes two clients 12A and 12B and two servers 20 and 22. Clients 12A and 12B obtain connections to server 20 via an intermediate data processing system, such as an Internet service provider ("ISP") 24. Also, clients 12A and 12B utilize the TCP/IP and HTTP protocols to communicate with servers 20 and 22 over communications media 26 (which may include such media as twisted-pair cables, coaxial cables, telephone lines, optical fibers, microwave links, and/or radio links).

Preferably, network 10 is a portion of the Internet, with clients 12A and 12B and servers 20 and 22 being connected to, or capable of connecting with, many additional clients and servers. As described in greater detail below, in the illustrative embodiment server 22 contains publicly accessible Web pages and server 20 includes a publicly accessible search engine. Also, each of clients 12A and 12B includes a Web browser with facilities for accepting and storing so called "cookies" from, and returning cookies to, Web servers (such as server 20).

As recognized by those of ordinary skill in the art, a cookie is a data item relating to a Web page that a Web server causes to be stored on a client. In accordance with the HTTP protocol, the cookie is automatically returned to the Web server by the client whenever the client subsequently accesses the Universal Resource Locator (URL) corresponding to that Web page. Servers commonly utilize cookies to identify clients, for example so that repeat users may be recognized.

Figure 2:
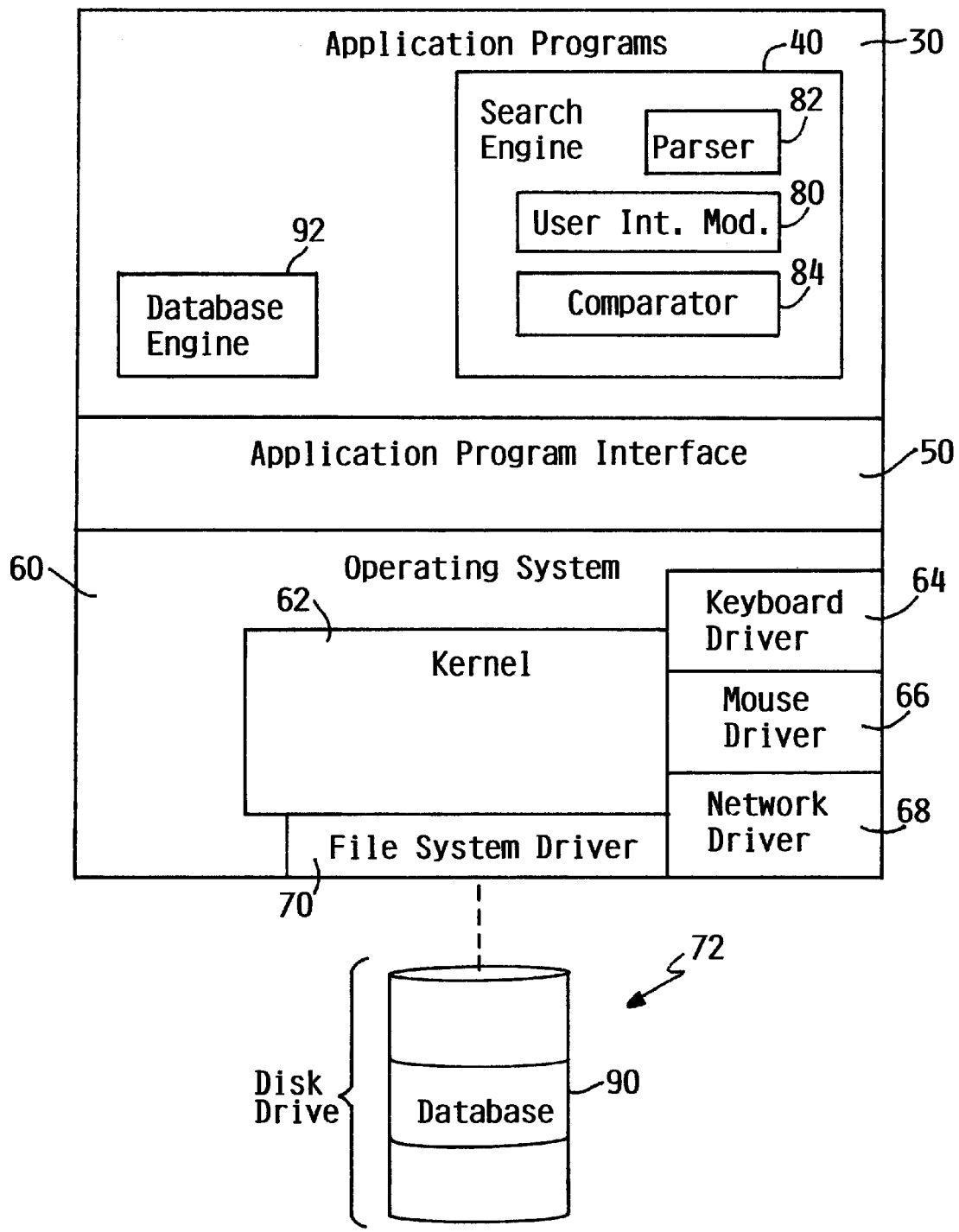
FIG. 2 depicts a layer diagram of software that includes program logic for supporting metaword searches according to the present invention.

Referring now to FIG. 2, there is illustrated a layer diagram of the software of server 20. At the lowest level of the diagram is the operating system 60, which manages the operations of server 20 by performing duties such as resource allocation, task management, and error detection. Operating system 60 also provides tools for managing communications between server 20 and remote data processing systems (such as clients 12A and 12B). Included in operating system 60 is a kernel 62 that manages the memory, files, and peripheral devices of server 20. The lowest level also includes device drivers, such as a keyboard driver 64, a mouse driver 66, a network driver 68, and a file system driver 70, which kernel 62 utilizes to 21 manage input from and output to peripheral devices, communication ports, and storage media (such as disk drive 72). At the intermediate level is an application program interface (API) 50, through which application programs 30 request services from operating system 60. The highest level of the diagram contains the application programs 30, which include the search engine 40.

The primary functions of search engine 40 include receiving search requests from users and, in response, returning hit lists identifying Web pages corresponding to the received search requests. Search engine 40 contains a number of components that operate cooperatively to perform those functions. One of those components is a user interface module 80, which generates the Web pages that are presented to the user as the interface to search engine 40. Another component is a parser 82, which translates search expressions received from the user (i.e., initial search expressions) into expanded search expressions, in which metawords are replaced with associated replacement search terms, boolean functions, and/or boolean operators.

In addition, search engine 40 includes a comparator 84 that determines which documents match the expanded search expression. In the illustrative embodiment that determination is made by reference to a database 90, which associates the addresses of numerous Web pages (including Web pages stored on server 22) with the content of those Web pages. For instance, database 90 may contain summaries of, excerpts from, and/or keywords associated with those Web pages. Preferably, database 90 includes this kind of information for millions of Web pages on hundreds or thousands of Web servers, and comparator 84 preferably utilizes the services of a database engine 92 to obtain the required information from database 90. In the illustrative embodiment database 90 is stored on disk drive 72; however, database 90 could as well be stored entirely or partially in CD-ROM drives, in memory, or on any other appropriate medium or combinations of media (including storage media of one or more additional data processing system). Once the matching documents are identified, a hit list identifying those documents is returned to the user by user interface module 80.

Figure 3:
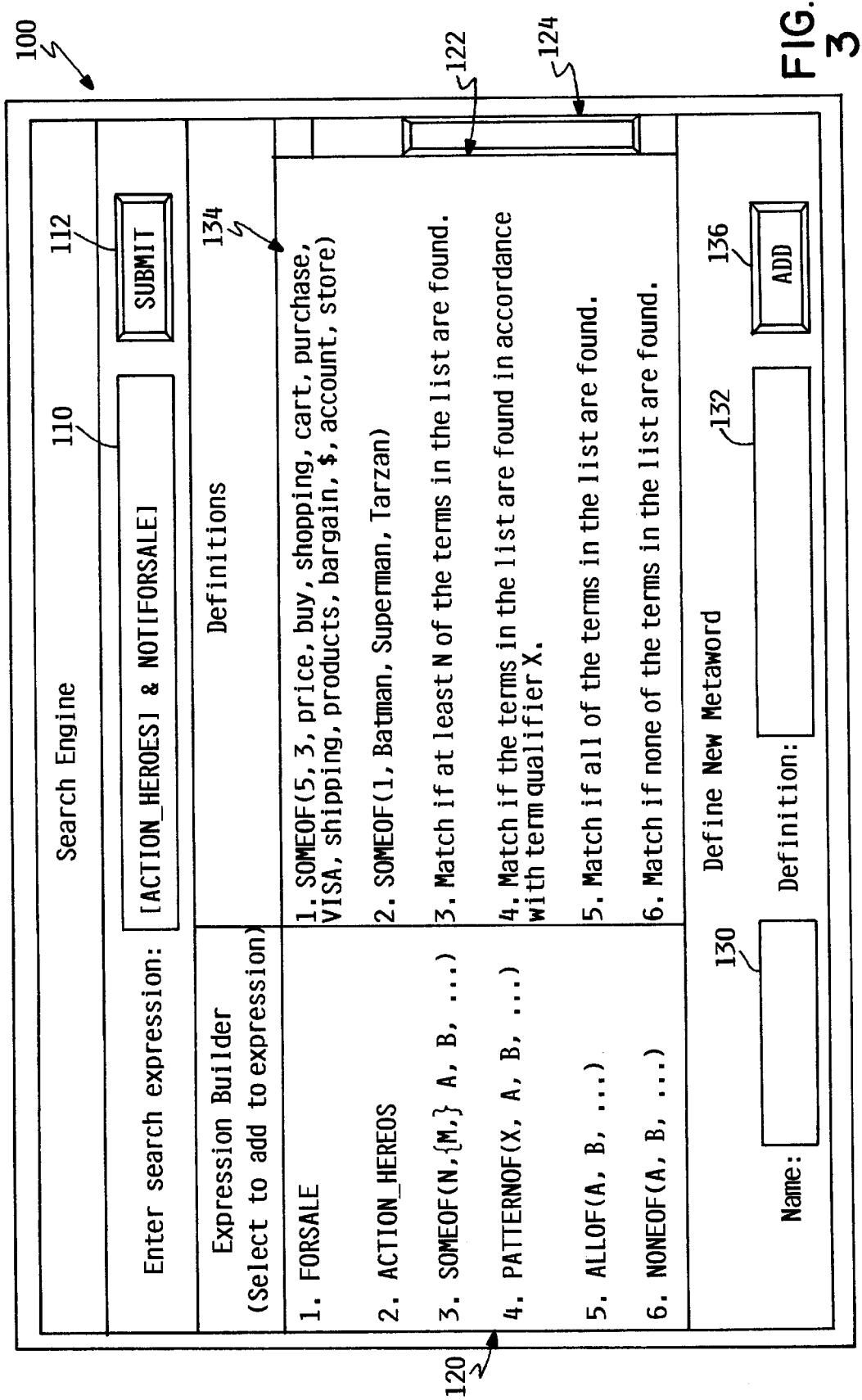
FIG. 3 is a pictorial representation of an exemplary user interface with support for metaword searches according to the present invention.

With reference to FIG. 3, there is depicted an illustrative user interface 100 with support for metaword searches according to the present invention. In the illustrative embodiment, user interface 100 is a Web page that is built dynamically by search engine 40 and returned to clients in response to user requests referencing the home URL of search engine 40. As illustrated, user interface 100 includes a search field 110 into which the user may type a search expression and a submit button 112 for causing the client to transmit the search expression to search engine 40.

User interface 100 also includes a metaword list 120 and a corresponding metaword definition list 122. A scroll bar 124 is also provided if either of the above lists does not fit entirely within its respective display area. When a user selects a desired metaword from metaword list 120 (for instance, by using a pointing device such as a mouse to click on a desired metaword), that metaword is automatically added to the search expression in search field 110, starting at the point occupied by the cursor when the selection is made. Also, square brackets are utilized to distinguish metawords within search expressions from other words or boolean operators. The square brackets are automatically included in search field 110 with the metawords when users select those metawords from metaword list 120. In addition, metaword definition list 122 is preferably susceptible to conventional SELECT and COPY edit functions, to facilitate the entry of new definitions (as described below) that are based on, or similar to, old definitions.

When generated for a new user, metaword list 120 and metaword definition list 122 contain a default set of metawords and boolean functions. For example, in a default configuration, metaword list 120 could contain the metaword FORSALE and the boolean functions SOMEOF( ), PATTERNOF( ), ALLOF( ), and NONEOF( ). The metawords and boolean functions in metaword list 120 allow users to build efficient search expressions with little effort or expertise. The operation of each of the items referenced above are described in greater detail below following the remainder of the description of user interface 100.

When generated for a returning user (i.e., a user that has accessed search engine 40 before), the contents of metaword list 120 and metaword definition list 122 may be modified from the default in accordance with any changes recorded by the returning user during previous sessions. User interface 100 allows users to record such changes through utilization of a name field 130 and a definition field 132 (both of which accept forms of input including typing and "pasting"), and an ADD button 136 for recording the entered data. An example of a user-defined metaword in FIG. 3 is the metaword ACTION_HEROES. According to the illustrative embodiment, user-defined metawords are stored in the clients as cookies. In alternative embodiments, however, user-defined metawords could be saved on a server, for example as part of a user profile.

The boolean functions described above and the metawords, such as FORSALE, have particular meanings which help users to build efficient search expressions with ease. In particular, the boolean function SOMEOF( ) has two or more required arguments and one optional argument. The first required argument is a count qualifier (N), and the remaining required arguments are a list of one or more terms. A term is a word, a phrase, or a metaword. A phrase is a group of words enclosed by quotation marks. The optional argument (M) is a diversity qualifier. In FIG. 3, argument M is shown nested within curly brackets to indicate optionality.

With respect to a candidate document, search engine 40 evaluates the SOMEOF( ) function as TRUE if N of the terms in the list are found in that document (preferably, with multiple occurrences of a term counted cumulatively). Thus, N specifies a threshold number of occurrences of the terms in the list. The diversity qualifier specifies a minimum number of different terms from the list which must be found for the function to evaluate as TRUE. If no value is supplied for M, the default value of 1 is utilized. For example, with reference to the definition 134 of the metaword FORSALE, the value 5 is specified for the count qualifier, the value 3 is specified for the diversity qualifier, and 12 words are specified for the list of terms. Consequently, for a document to match that FORSALE metaword, the document must contain at least five occurrences of any one or more of those twelve words and the document must contain at least three different words among those twelve. If all of the boolean expressions in a search expression evaluate as TRUE for a candidate document, that document is considered a match, to be included in the hit list.

PATTERNOF( ) also has two or more required arguments. At least one of the arguments is a term qualifier (X). The other argument or arguments is a list of one or more terms. A term qualifier may be a count qualifier. Alternatively, a term qualifier may be a frequency qualifier that specifies a threshold frequency for one or more of the terms (e.g., 3 occurrences of a phrase within a block of 1000 words) or a proximity qualifier that specifies a relative placement for one or more of the terms (e.g., "expiration date" within 8 lines of "credit card").

ALLOF( ) and NONEOF( ) have one or more arguments each, the arguments consisting of a list of one or more terms. ALLOF( ) evaluates as TRUE if all of the terms in the list are found in a candidate document, and NONEOF( ) evaluates as TRUE if none of the terms in the list are found.

As shown in metaword definition list 122, metaword ACTION_HEROES has been defined as SOMEOF(1, Batman, Superman, Tarzan). Consequently, ACTION_HEROES will evaluate as TRUE if a candidate document includes one or more occurrences of any of the specified words. Similarly, FORSALE will evaluate as TRUE if five or more occurrences of any of the specified words (i.e., buy, shopping, cart, etc.) are found in a candidate document. According to the present invention, a metaword definition specifies a name for the metaword and associates a specified boolean expression with that name. A boolean expression is a group of one or more terms, boolean operators, and/or boolean functions which, when evaluated, produces a boolean result. A boolean expression can be simple (e.g., a list of one or more terms to be evaluated as if connected by the OR operator) or complex (e.g., a number of sub-expressions including multiple boolean functions and sets of parentheses).

Search field 110 includes an example of a search expression that could be built with ease by a novice Internet user and that will return a much more efficient hit list than might otherwise be obtained without significantly more effort on the part of the user. Specifically, the search expression is as follows: [ACTION_HEROES] & NOT [FORSALE]. This search expression will produce a hit list containing documents that include the names of action heroes (as described above), but omitting documents presumably from retailers merely attempting to market goods relating to those action heroes. That is, the NOT [FORSALE] sub-expression will cause a document to be excluded if that document contains five or more references to any one or more of the words in the FORSALE list of terms while also containing at least three different words from that list.

Figure 4:
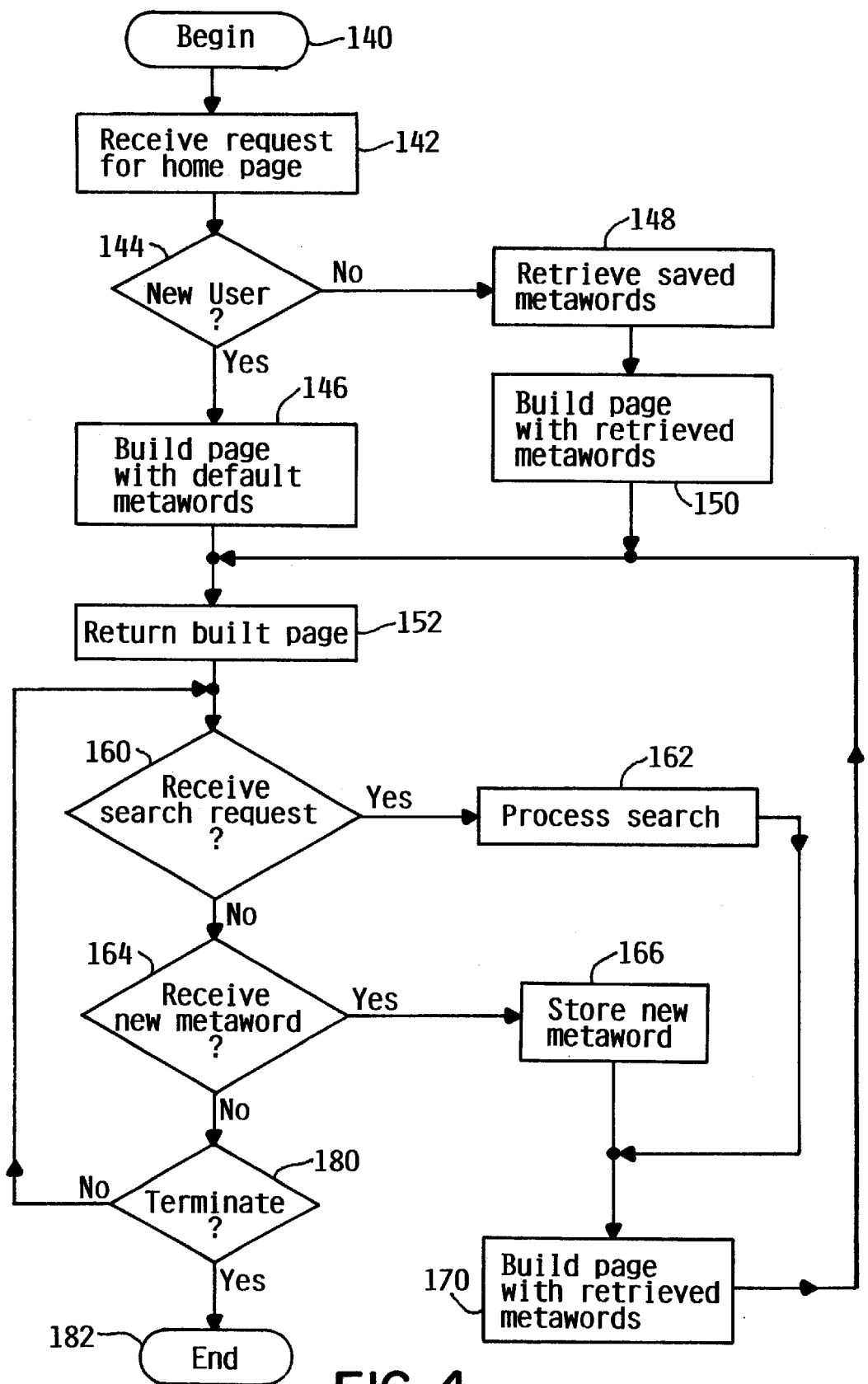
FIG. 4 depicts a high-level logical flowchart of an exemplary process, in accordance with the present invention, for supporting metaword searches.

Referring now to FIG. 4, there is illustrated a high-level logical flowchart of an exemplary process, in accordance with the present invention, for supporting metaword searches. The process begins at block 140 with search engine 40 executing in server 20. The process then passes to block 142, which illustrates server 20 receiving a request for the home page of search engine 40 from client 12A. Search engine 40 then examines any cookies included in the request from client 12A to determine whether the request is coming from a new user, as illustrated at block 144. If the user is a new user, user interface module 80 of search engine 40 builds a user interface that includes the default metaword list 120, as shown at block 146. Otherwise, as depicted at blocks 148 and 150, respectively, search engine first retrieves the current user's saved metawords and then builds a user interface with a customized metaword list 120 (i.e., a metaword list that includes any user-defined metawords recorded by the current user). In the illustrative embodiment, search engine 40 retrieves the user-defined metawords by extracting them from one or more cookies that accompanied the originating request (i.e., the request for the home page of search engine 40).

Once the user interface has been built, search engine 40 transmits the user interface to client 12A as a Web page to be displayed by a Web browser, as illustrated at block 152. The user then interacts with the user interface at client 12A to either submit a search expression or record a new metaword, as described above with reference to FIG. 3. As depicted at block 160, search engine 40 then determines whether a search request has been received from client 12A. If so, search engine 40 utilizes parser 82 to interpret the search request, in accordance with the syntax described above, and utilizes comparator 84 and database engine 92 to process the search request and generate a resulting hit list, as depicted at block 162. In particular, if the initial search expression includes one or more metawords, parser 82 generates an expanded search expression in which those metawords are replaced by the corresponding search terms, boolean functions, and/or boolean operators, and the expanded search expression is then passed to comparator 84.

However, referring again to block 160, if it is determined that no search request has been received, search engine 40 then determines whether a request to add a new metaword has been received from client 12A, as illustrated at block 164. If an add request has been received, search engine 40 causes the new metaword to be stored, as shown at block 166, preferably by transmitting an appropriate metaword definition to client 12A to be stored as a cookie.

As illustrated at block 170, after the search request or add request has been processed, search engine 40 builds a new user interface screen including the hit list and/or an updated metaword list, as appropriate. The process of receiving user requests is then repeated, beginning with the new user interface being returned to client 12A, as illustrated at block 152.

However, referring again to block 164, if no add request was received, search engine 40 determines whether the process should be terminated (for instance in response to a determination that the connection between client 12A and server 20 has been terminated), as depicted at block 182. If so, the process ends, as shown at block 182. Otherwise, the process returns to block 160, and search engine 40 continues to handle search and add requests.

An Extensible Markup Language (XML) format may be utilized to encode the default and user-defined metawords for transmission to and from search engine 40. The following is an illustrative set of metaword definitions encoded in an XML format.

```
<metaset>
    <someof name="FORSALE" some="5" min="3">
        <item>price</item>
        <item>buy</item>
        <item>shopping</item>
        <item>cart</item>
        <item>purchase</item>
        <item>VISA</item>
        <item>shipping</item>
        <item>products</item>
        <item>bargain</item>
        <item repeat="3">$</item>
        <item>account</item>
        <item>store</item>
    </someof>
    <someof name="ACTION_HEROES" some="1">
        <item>Tarzan</item>
        <item>Batman</item>
        <item>Superman</item>
    </someof>
    <allof name="ACTION_HERO_READING">
        <group ref="ACTION_HEROES"/>
        <group ref="FORSALE" invert="yes"/>
    </allof>
    <patternof name="CREDIT_CARD" repeat="3" words="1000">
        <item>credit card number</item>
    </patternof>
    <patternof name="CREDIT_CARD_DATA" words="200">
        <item>credit card</item>
        <item>expiration date</item>
```

-continued

```
    </patternof>
    <noneof name="FAMILY_CONTENTS">
        <item>XXX</item>
              :    :    :
        <item>nude</item>
    </noneof>
</metaset>
```

As indicated, the set of metawords is bracketed by the "metaset" "/metaset" tags, and each individual metaword is defined with a type that corresponds to one of the boolean functions and with a user-defined name. In addition, each metaword definition includes items, and/or group references specifying the search criteria to be utilized. For example, ACTION_HERO_READING is defined as an ALLOF( ) function that evaluates the nested metawords ACTION_HEROES and FORSALE. When utilized as a search expression, ACTION_HERO_READING will consider a candidate document to be a match if ACTION_HEROES evaluates to TRUE and the inverse of FORSALE evalutes to TRUE (i.e., FORSALE evaluates to FALSE).

As has been described, the present invention introduces a number of useful boolean functions and a convenient yet effective mechanism for building and submitting highly efficient search expressions. While the invention has been described with reference to an illustrative embodiment, it will be understood by those skilled in the art that various changes in form and detail may be made to the illustrative embodiment without departing from the spirit and scope of the invention.

For example, although the illustrative embodiment provides name field 130 and definition field 132 for receiving user input defining new metawords, alternative embodiments include metaword definition wizards that help inexperienced users create new metawords by prompting the users, in a step-by-step manner, for the information required to define new metawords. For instance, user interface 100 could include a DEFINE NEW METAWORD button or menu item, in addition to (or in lieu of) name field 130, definition field 132, and ADD button 136. When the DEFINE NEW METAWORD button or menu item is selected, the wizard could begin the process of collecting the required information by inquiring into whether the user desires to list words that should be present or words that should not be present in a document to produce a match. The response to that question would then influence the question or questions to be posed next. Alternatively, a search engine might utilize an on-line form to prompt the user for the information required to define a metaword.

Alternative embodiments also include import and export functions for migrating sets of metawords (for instance, between different search engines). Preferably, such functions would utilize an XML format (such as the one illustrated above) to define the metawords. For example, IMPORT METAWORDS and EXPORT METAWORDS menu sub-items could be added to the PROPERTIES item of the FILE menu of a Web browser. Those functions could prompt the user for the name of the file containing the metaword definitions.

Also, the metawords and their definitions are stored as cookies in a client in the illustrative embodiment. However, the present invention also includes alternative embodiments in which recording constructs other than cookies are utilized to store some or all of the metawords. For example, the default metawords and/or their definitions may be stored on the server, with only the user-defined metawords stored on the client. Additionally, the present invention includes alternative embodiments in which the client rather than the server expands (or parses) the search expressions by replacing metawords with corresponding boolean functions, etc. Such a client would send the expanded search expression to the server for processing by the comparator. Additional alternative embodiments include search engines with facilities for storing user profiles that a user may activate by entering a userid and password, rather than the user profile being determined solely by reference to client cookies.

In addition, although the illustrative embodiment involves a network of data processing systems, the present invention could also be utilized to advantage in a single data processing system, for example as a feature of a utility for locating files with the data processing system. Also, it should be understood that the present invention is not limited to any particular type of data processing environment and may be implemented in many different hardware contexts, including, without limitation, personal computers, minicomputers, mainframe computers, and collaborative data processing environments involving combinations of one or more different types of computers.

Furthermore, certain operations of the present invention have been described as being performed by software, particularly by user interface module 80, parser 82, and comparator 84, each of which is depicted as a component of search engine 40. However, those of ordinary skill in the art will appreciate that some or all of the described operations could be performed alternatively by components that are separate from search engine 40, whether those components are implemented as software, hardware, firmware, or a combination of these.

It should also be understood that the present invention is not limited to Internet or HTTP communications, but could as well benefit collaborative data processing environments utilizing other protocols. Likewise, although the illustrative embodiment utilizes HTTP cookies for certain purposes, alternative embodiments for other protocols might utilize similar, but not identical, mechanisms to accomplish those purposes.

Also, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of processing a search expression for finding electronic documents, said method comprising:

receiving an initial search expression that includes at least one metaword;

in response to receiving said initial search expression, determining that said at least one metaword corresponds to a boolean expression, wherein said step of determining that said at least one metaword corresponds to a boolean expression comprises determining that said at least one metaword corresponds to one or more terms and a count qualifier; and in response to determining that said at least one metaword corresponds to a boolean expression, generating an expanded search expression that includes said boolean expression in lieu of said at least one metaword, such that said expanded search expression is utilized in lieu of said initial search expression to find said electronic documents, wherein said step of generating an expanded search expression comprises including said one or more terms and said count qualifier in said expanded search expression in lieu of said metaword, wherein said count qualifier specifies a threshold number of occurrences of said one or more terms within a respective electronic document, each respective electronic document satisfying a condition of said expanded search expression only if said one or more terms occur in the respective electronic document no fewer than said threshold number of occurrences.

2. The method of claim 1, wherein:

said step of determining that said at least one metaword corresponds to a boolean expression comprises determining that said at least one metaword corresponds to a list of two or more terms; and said step of generating an expanded search expression comprises including said two or more terms in said expanded search expression in lieu of said at least one metaword.

3. The method of claim 1, wherein:

said step of generating an expanded search expression comprises including a someof function in said expanded search expression lieu of said metaword, wherein said someof function includes said one or more terms and said count qualifier as required parameters and a diversity qualifier as an optional parameter; and said method further comprises utilizing said expanded search expression with said someof function to determine which of said electronic documents contain at least said threshold number of occurrences of said one or more terms while also containing at least as many different terms among said one or more terms as required by said diversity parameter.

4. A method of processing a search expression for finding electronic documents, said method comprising:

receiving an initial search expression that includes at least one metaword;

in response to receiving said initial search expression, determining that said at least one metaword corresponds to a boolean expression; and in response to determining that said at least one metaword corresponds to a boolean expression, generating an expanded search expression that includes said boolean expression in lieu of said at least one metaword, such that said expanded search expression is utilized in lieu of said initial search expression to find said electronic documents;

wherein said step of determining that said at least one metaword corresponds to a boolean expression comprises determining that said at least one metaword corresponds to a patternof function that includes one or more terms and one or more term qualifiers;

wherein said step of generating an expanded search expression comprises including said patternof function in said expanded search expression in lieu of said metaword; and wherein said method further comprises utilizing said expanded search expression in lieu of said initial search expression to find said electronic documents.

5. The method of claim 4, wherein:

said step of determining that said at least one metaword corresponds to a patternof function comprises determining that said at least one metaword corresponds to a patternof function that includes two or more terms and one or more term qualifiers, wherein at least one of said one or more term qualifiers specifies a placement of at least one of said two or more terms, relative to at least one other of said two or more terms; and said step of utilizing said expanded search expression comprises determining which of said electronic documents contain said two or more terms, with said at least one of said two or more terms having said specified placement.

6. A method of processing a search expression for finding electronic documents, said method comprising:

receiving an initial search expression that includes at least one metaword;

in response to receiving said initial search expression, determining that said at least one metaword corresponds to a boolean expression; and in response to determining that said at least one metaword corresponds to a boolean expression, generating an expanded search expression that includes said boolean expression in lieu of said at least one metaword, such that said expanded search expression is utilized in lieu of said initial search expression to find said electronic documents;

said method further comprising the preceding steps of:

providing a search interface that allows a user to define said initial search expression; and automatically presenting said at least one metaword within said search interface, such that said at least one metaword is automatically added to said initial search expression in response to user selection of said at least one metaword.

7. A method of processing a search expression for finding electronic documents, said method comprising:

receiving an initial search expression that includes at least one metaword;

in response to receiving said initial search expression, determining that said at least one metaword corresponds to a boolean expression;

in response to determining that said at least one metaword corresponds to a boolean expression, generating an expanded search expression that includes said boolean expression in lieu of said at least one metaword, such that said expanded search expression is utilized in lieu of said initial search expression to find said electronic documents; and providing facilities that allow a user to define and store user-defined metawords.

8. A method of processing a search expression for finding electronic documents, said method comprising:

receiving an initial search expression that includes at least one metaword;

in response to receiving said initial search expression, determining that said at least one metaword corresponds to a boolean expression;

in response to determining that said at least one metaword corresponds to a boolean expression, generating an expanded search expression that includes said boolean expression in lieu of said at least one metaword, such that said expanded search expression is utilized in lieu of said initial search expression to find said electronic documents; and providing facilities for performing at least one of an import function and an export function for importing metaword definitions to a search engine and exporting metaword definitions from a search engine, respectively.

9. A program product for processing a search expression for finding electronic documents, said program product comprising a plurality of computer executable instructions embodied in signal bearing media, wherein said instructions cause a computer to perfrom the steps of:

providing a search interface that allows a user to define an initial search expression;

automatically presenting at least one metaword within said search interface, such that said at least one metaword is automatically added to said initial search expression in response to user selection of said at least one metaword;

receiving said initial search expression that includes at least one selected metaword;

in response to receiving said initial search expression, determining that said at least one selected metaword corresponds to a boolean expression; and in response to determining that said at least one selected metaword corresponds to a boolean expression, generating an expanded search expression that includes said boolean expression in lieu of said at least one selected metaword, such that said expanded search expression is utilized in lieu of said initial search expression to find said electronic documents.

10. The program product of claim 9, wherein:

said step of determining that said at least one metaword corresponds to a boolean expression comprises determining that said at least one metaword corresponds to a list of two or more terms; and said step of generating an expanded search expression comprises including said two or more terms in said expanded search expression in lieu of said at least one metaword.

11. The program product of claim 9, wherein:

said step of determining that said at least one metaword corresponds to a boolean expression comprises determining that said at least one metaword corresponds to one or more terms and a count qualifier, wherein said count qualifier specifies a threshold number of occurrences of said one or more terms within a single electronic document; and said step of generating an expanded search expression comprises including said one or more terms and said count qualifier in said expanded search expression in lieu of said metaword.

12. The program product of claim 11, wherein:

said step of generating an expanded search expression comprises including a someof function in said expanded search expression lieu of said metaword, wherein said someof function includes said one or more terms and said count qualifier as required parameters and a diversity qualifier as an optional parameter; and said program product further cause said computer to perform the step of utilizing said expanded search expression with said someof function to determine which of said electronic documents contain at least said threshold number of occurrences of said one or more terms while also containing at least as many different terms among said one or more terms as required by said diversity parameter.

13. The program product of claim 9, wherein:

said step of determining that said at least one metaword corresponds to a boolean expression comprises determining that said at least one metaword corresponds to a patternof function that includes one or more terms and one or more term qualifiers;

said step of generating an expanded search expression comprises including said patternof function in said expanded search expression in lieu of said metaword; and said program product further cause said computer to perform the step of utilizing said expanded search expression with said patternof function to find said electronic documents.

14. The program product of claim 13, wherein:

said step of determining that said at least one metaword corresponds to a patternof function comprises determining that said at least one metaword corresponds to a patternof function that includes two or more terms and one or more term qualifiers, wherein at least one of said one or more term qualifiers specifies a placement of at least one of said two or more terms, relative to at least one other of said two or more terms; and said step of utilizing said expanded search expression comprises determining which of said electronic documents contain said two or more terms, with said at least one of said two or more terms having said specified placement.

15. The program product of claim 9, wherein said program product further cause said computer to perform the step of providing facilities that allow a user to define and store user-defined metawords.

16. The program product of claim 9, wherein said program product further cause said computer to perform the step of providing facilities for performing at least one of an import function and an export function for importing metaword definitions to a search engine and exporting metaword definitions from a search engine, respectively.

* * * * *